(12) United States Patent
Lu et al.

(10) Patent No.: US 11,898,677 B1
(45) Date of Patent: Feb. 13, 2024

(54) QUICK INSERTION LOCKING CONNECTOR

(71) Applicant: Luxecasting Machinery Co., Ltd., Gao'an (CN)

(72) Inventors: Xiaobin Lu, Gao'an (CN); Chengyong Yang, Gao'an (CN)

(73) Assignee: Luxecasting Machinery Co., Ltd., Gao'an (CN)

( * ) Notice: Subject to any disclaimer, the term of this patent is extended or adjusted under 35 U.S.C. 154(b) by 0 days.

(21) Appl. No.: 18/230,399

(22) Filed: Aug. 4, 2023

(51) Int. Cl.
*F16L 37/23* (2006.01)

(52) U.S. Cl.
CPC ..................................... *F16L 37/23* (2013.01)

(58) Field of Classification Search
CPC ............ F16L 37/08; F16L 37/22; F16L 37/23
See application file for complete search history.

(56) References Cited

U.S. PATENT DOCUMENTS 4,781,399 A * 11/1988 Collon .................. F16L 17/035
285/8
2022/0356974 A1* 11/2022 Tremblay ................ F16L 37/22

FOREIGN PATENT DOCUMENTS

CN 112303365 A 2/2021

* cited by examiner

*Primary Examiner* — Aaron M Dunwoody

(74) *Attorney, Agent, or Firm* — Occhiuti & Rohlicek LLP

(57) ABSTRACT

A quick insertion locking connector is disclosed and includes a female connector body, a receiving joint providing with multiple limiting holes, a sliding sleeve sleeving a first boss provided on an outer wall of the receiving joint, a protective sleeve and a sealing ring. Limiting elements are arranged in the limiting holes. A second boss abuts against the outer wall of the receiving joint. A recess and a boss base extending along inside of the receiving joint are formed on an inner wall of the receiving joint. The sealing ring is arranged on the boss base and extends into the recess. Multiple limiting grooves are circumferentially formed in an outer wall of a male connector body which is configured for being inserted into the receiving joint and abutting against the sealing ring located on the boss base and the sealing ring located in the recess.

9 Claims, 3 Drawing Sheets

QUICK INSERTION LOCKING CONNECTOR

TECHNICAL FIELD

The present disclosure relates to the technical field of pipeline connectors, in particular to a quick insertion locking connector.

BACKGROUND

The quick connector is a connector capable of connecting or disconnecting pipelines without tools. The quick connector is a common connector in the field of fluid transportation connection. Generally, the existing quick connector is composed of a main body, a handle and pins, and has the disadvantages of complex structure, high machining accuracy, large stress on the sealing ring, poor sealing performance, large occupied volume, laborious installation and the like.

For example, the quick connector in the publication number of CN112303365A includes a male connector and a female connector. The male connector includes a plug. A plug connector body sleeves an inner wall of the rear part of the plug. The middle part of an inner wall of the plug is provided with a plug socket. A plug core is arranged in the front of the inner wall of the plug. A check groove is formed in an outer wall of the plug. The female connector includes a shell and an outer sleeve. The outer sleeve sleeves an outer wall of the front part of the shell. The outer sleeve is connected with steel balls. The steel balls are located in through holes of the shell. A sleeve spring is arranged between the shell and the outer sleeve. An inner wall of the rear part of the shell is provided with a shell connector body. A shell seat is clamped at the joint of the shell and the shell connector. A shell pad is arranged behind the shell seat. The shell seat is in contact with a shell core nut. A shell core rod sleeves the shell core nut. The front part of the shell core rod is in contact with the shell core. The technical scheme is complex in operation and poor in sealing effect.

In order to solve the above problems, the present disclosure provides a quick insertion locking connector so as to solve the existing problems of poor sealing effect and complex structure of the locking connector.

SUMMARY

The purpose of the present disclosure is to provide a quick insertion locking connector so as to achieve the purpose of improving the sealing effect of the locking connector and simplifying the structure. The sealing effect of the existing common locking connector is poor. Although a sealing ring is arranged, the sealing effect of the sealing ring is limited. Due to the sealing ring is arranged on a female connector, when a male connector is inserted into the female connector, in the conventional sealing ring arrangement, only the position of the end of the male connector can be sealed planarly and does not extend towards an inner wall of the male connector. However, fluid may still flow out from a gap between the male connector and the female connector. In the quick insertion locking connector, a male connector body extends into the sealing ring and is wrapped and sealed by the sealing ring located in the groove, so that the purpose of improving the sealing effect is achieved, the quick insertion locking connector is simple in structure, small in occupied space, and convenient and quick to assemble and disassemble, and solves the problem of poor sealing effect in the existing locking connector.

In order to achieve the purpose, the present disclosure provides the following scheme.

A quick insertion locking connector includes a female connector and a male connector inserted into the female connector. The female connector includes a female connector body, a receiving joint arranged at one end of the female connector body, a sliding sleeve and a protective sleeve which sleeve an outer wall of the receiving joint in sequence, and a sealing ring arranged on an inner wall of the receiving joint. A plurality of limiting holes are circumferentially formed in a side wall of the receiving joint. Limiting elements are arranged in the limiting holes. The limiting holes are capable of limiting the limiting elements from being inwardly separated from the limiting holes. A first boss is provided on the outer wall of the receiving joint. A second boss is provided on an inner wall of the sliding sleeve. The sliding sleeve sleeves the first boss, the second boss abuts against the outer wall of the receiving joint, such that the first boss, the second boss, the sliding sleeve and the receiving joint form a mounting cavity for receiving an elastic element in a compressed state. A recess and a boss base extending along the inside of the receiving joint are formed in the inner wall of the receiving joint, the sealing ring is arranged on the boss base and extends into the recess, the male connector comprises a male connector body, a plurality of limiting grooves are circumferentially formed in an outer wall of the male connector body. When the male connector body is inserted into the receiving joint, the second boss slides to the limiting holes and presses the limiting elements into the limiting grooves. When the second boss slides away from the limiting holes, the limiting elements are capable of being separated from the limiting grooves; and the male connector body is configured for being inserted into the receiving joint and abutting against a part of the sealing ring located on the boss base and a part of the sealing ring located in the recess.

In some embodiments, the sealing ring extends along an inner wall of the recess and is bent towards an interior of the receiving joint to form a bending part, and the bending part is attached to the outer wall of the male connector body.

In some embodiments, the limiting elements are limiting balls or limiting blocks.

In some embodiments, the limiting grooves each have an arc surface.

In some embodiments, the elastic element is a spring.

In some embodiments, the limiting holes are stepped holes, so that the limiting elements are capable of entering into the limiting grooves through the stepped holes and being clamped in the limiting grooves.

In some embodiments, the stepped holes are circumferentially and uniformly formed in the side wall of the receiving joint.

In some embodiments, the receiving joint and the male connector body are made of carbon steel, aluminum alloy, copper alloy or stainless steel.

In some embodiments, a side, away from the sealing ring, of the second boss is an inclined surface.

Compared with the prior art, the present disclosure has the following technical effects.

According to the quick insertion locking connector, the male connector body extends into the sealing ring, the male connector body is wrapped and sealed by the sealing ring located in the groove, so that the purpose of improving the sealing effect is achieved, the male body is simple in structure, small in occupied space, and convenient and quick to assemble and disassemble.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

Figure 1:
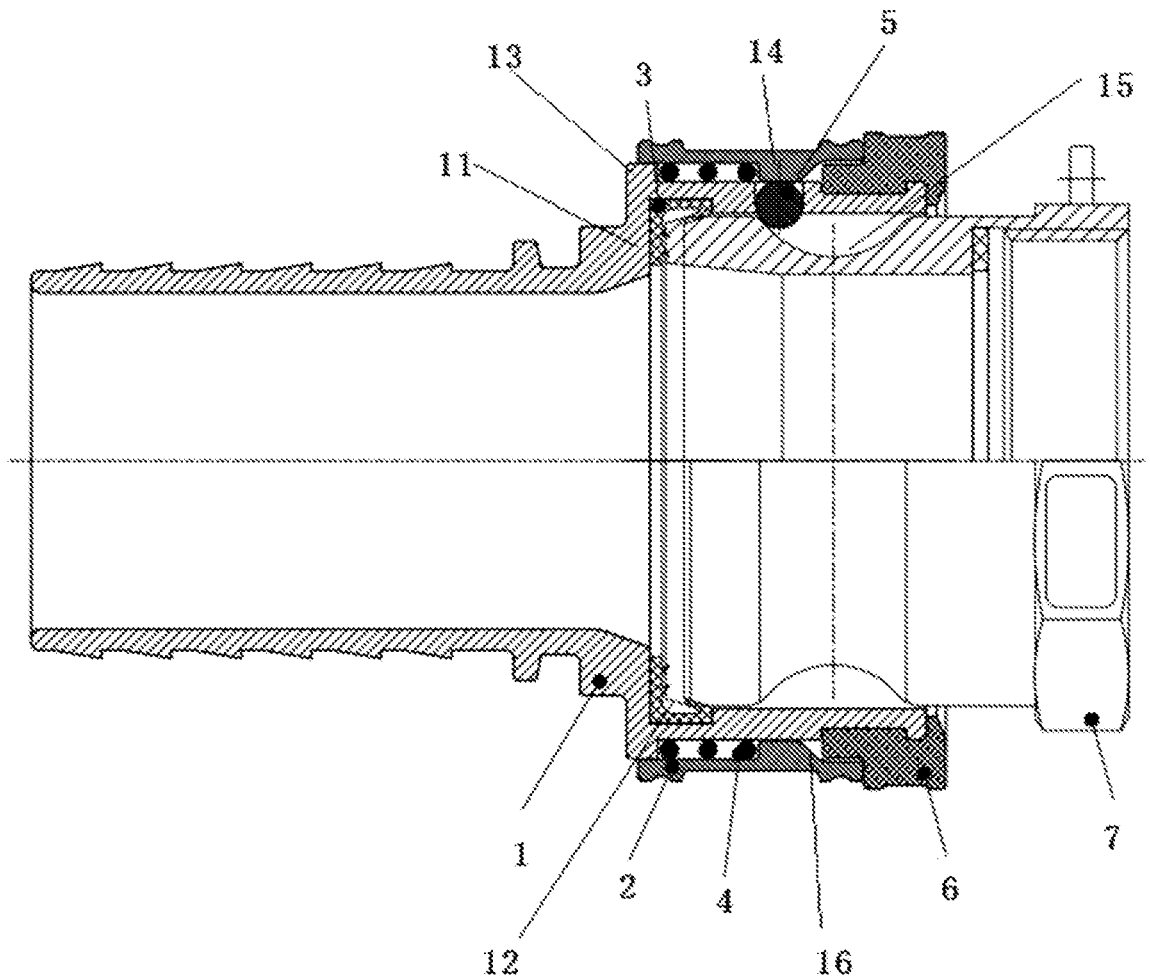
FIG. 1 is a structural schematic diagram of connection between a male connector and a female connector in the present disclosure.

Reference signs: 1, receiving joint; 2, sliding sleeve; 3, sealing ring; 4, spring; 5, limiting element; 6, protective sleeve; 7, male connector body; 8, limiting hole; 9, bending part; 10, limiting block; 11, boss base; 12, recess; 13, first boss; 14, second boss; 15, limiting groove; and 16, inclined surface.

DETAILED DESCRIPTION OF THE EMBODIMENTS

The following clearly and completely describes the technical solutions in the embodiments of the present disclosure with reference to the attached figures in the embodiments of the present disclosure. Apparently, the described embodiments are merely some rather than all of the embodiments of the present disclosure. Based on the embodiment in the present disclosure, all other embodiments obtained by the ordinary technical staff in the art under the premise of without contributing creative labor belong to the scope protected by the present disclosure.

The purpose of the present disclosure is to provide a quick insertion locking connector so as to achieve the purposes of improving the sealing effect of the locking connector and simplifying the structure.

To make the foregoing objective, features and advantages of the present disclosure clearer and more comprehensible, the present disclosure is further described in detail below with reference to the attached figures and specific embodiments.

Referring to FIG. 1 to FIG. 4, a quick insertion locking connector includes a female connector and a male connector inserted into the female connector. The female connector includes a female connector body, a receiving joint 1 arranged at one end of the female connector body, a sliding sleeve 2 and a protective sleeve 6 which sleeve an outer wall of the receiving joint 1 in sequence, and a sealing ring 3 arranged on an inner wall of the receiving joint 1. A plurality of limiting holes 8 are circumferentially formed in a side wall of the receiving joint 1. Limiting elements are arranged in the limiting holes 8. The limiting holes 8 can limit the limiting elements 5 from being separated from the limiting holes 8 inward. A first boss 13 is provided on the outer wall of the receiving joint 1. A second boss 14 is provided on an inner wall of the sliding sleeve 2. The sliding sleeve sleeves the first boss 13. The second boss abuts against the outer wall of the receiving joint 1. The first boss 13, the second boss 14, the sliding sleeve 2 and the receiving joint 1 form a mounting cavity for arranging an elastic element in a compressed state. A recess 12 is formed in the inner wall of the receiving joint 1. The inner wall of the receiving joint 1 is provided with a boss base 11 extending along the inside of the receiving joint 1. The sealing ring 3 is arranged on the boss base 11 and extends into the recess 12. The male connector includes a male connector body 7. A plurality of limiting grooves 15 are circumferentially formed in an outer wall of the male connector body 7. When the male connector body 7 is inserted into the receiving joint 1, the second boss slides to the limiting holes and presses the limiting elements 5 into the limiting grooves. When the second boss 14 slides away from the limiting holes 8, the limiting elements 5 can be separated from the limiting grooves 15. The male connector body 7 is configured for being inserted into the receiving joint and abutting against a part of the sealing ring 3 located on the boss base and a part of the sealing ring 3 located in the recess 12. According to the quick insertion locking connector, the male connector body 7 extends into the sealing ring 3, the male connector body 7 is wrapped and sealed by the sealing ring 3 located in the recess 12, so that the purpose of improving the sealing effect is achieved. In addition, the quick insertion locking connector is simple in structure, small in occupied space, and convenient and quick to assemble and disassemble.

Referring to FIG. 1, the end, away from the sealing ring 3, of the second boss has an inclined surface 16.

Figure 3:
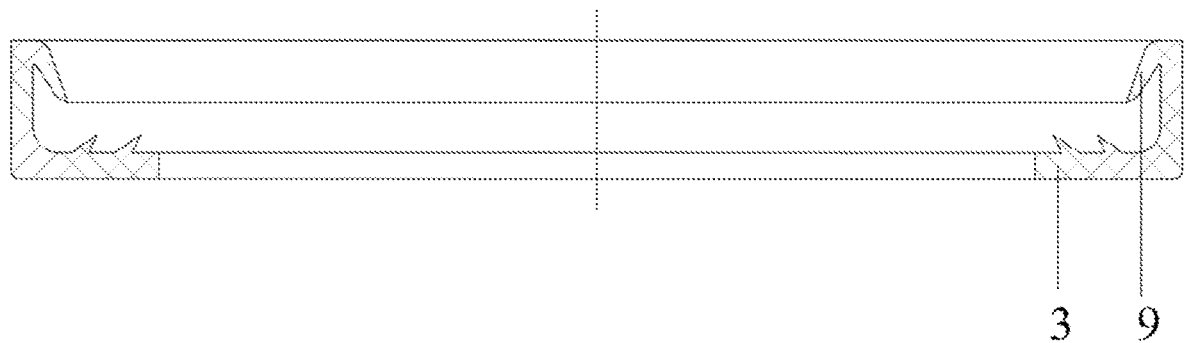
FIG. 3 is a structural schematic diagram of a sealing ring in the present disclosure.

Referring to FIG. 3, the sealing ring 3 extends along an inner wall of the recess and is bent towards an interior of the receiving joint 1 to form a bending part 9, and the bending part 9 is attached to the outer wall of the male connector body 7. The sealing effect between the male connector body 7 and the receiving joint 1 is further enhanced.

Figure 4:
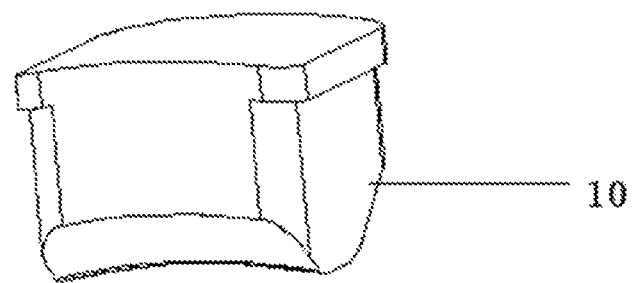
FIG. 4 is a structural schematic diagram of a limiting block in the present disclosure.

Referring to FIG. 4, the limiting elements each are a limiting ball or a limiting block 10.

Referring to FIG. 1, the limiting grooves 15 is each have an arc surface.

Referring to FIG. 1, the elastic element is a spring 4.

Further, the limiting holes 8 are stepped holes, so that the limiting elements 5 can enter into the limiting grooves 15 through the stepped holes and be clamped in the limiting grooves 15.

Figure 2:
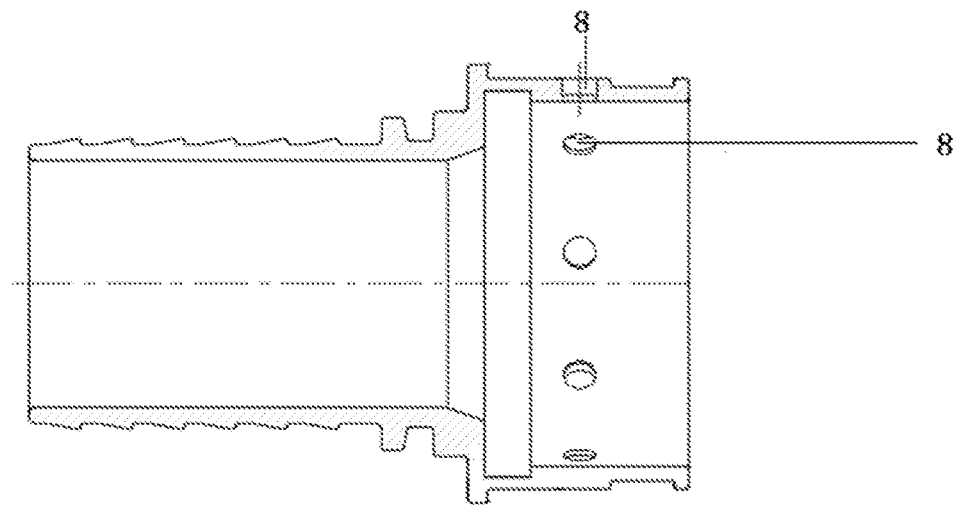
FIG. 2 is a structural schematic diagram of a female connector in the present disclosure.

Referring to FIG. 2, the stepped holes are circumferentially and uniformly formed in the side wall of the receiving joint 1.

Further, the receiving joint 1 and the male connector body are made of carbon steel, aluminum alloy, copper alloy or stainless steel.

The working process is as follows.

When the female connector is connected, the receiving joint 1 sleeves an outer perimeter of the male connector body 7 with one hand, and the sliding sleeve 2 is pulled to move away from the male connector body 7 with the other hand. At this time, the spring is compressed. The limiting elements are separated from the limitation of the second boss of the sliding sleeve 2. The limiting elements move radially away from the center of the receiving joint 1. At the same time, the receiving joint 1 continues to move toward the male connector body. When the male connector body abuts against the sealing ring 3, the sliding sleeve 2 is released. Under the elastic force of the spring 4, the sliding sleeve 2 moves in the direction of the male body. At this time, the inclined surface 16 on the second boss 14 presses against the limiting elements, and the limiting elements 5 moves in the axial direction of the receiving joint 1. When the sliding sleeve 2 moves in place, the surface of the second boss 14 clamps the limiting elements. At this time, the limiting elements partially enter into the limiting grooves 15 to prevent the receiving joint 1 from retreating, so that quick connection of the connector is realized. A stop valve of a pipeline is opened, and fluid can be transported.

When the female connector is disconnected, firstly, the stop valve of the pipeline is closed. The receiving joint 1 is held with one hand, and the sliding sleeve 2 is pushed away from a main body of the male connector with the other hand. At this time, the spring is compressed. The limiting elements are separated from the constraint of the second boss of the sliding sleeve 2. The limiting elements can move radially away from the circle center to the receiving joint 1 and move the receiving joint 1 away from the main body of the male connector at the same time. When the sliding sleeve 2 moves for a certain distance, the limiting elements move away from the limiting grooves 15 with the receiving joint 1. The receiving joint 1 is separated from the male connector body, so that disconnection between the female connector and the male connector is realized.

Adaptive changes made according to actual requirements are all within the protection range of the present disclosure.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. Any mark of attached figures in the claims should not be regarded as limitation to the involved claims.

What is claimed is:

1. A quick insertion locking connector, comprising a female connector and a male connector inserted into the female connector; wherein the female connector comprises a female connector body, a receiving joint arranged at one end of the female connector body, a sliding sleeve and a protective sleeve which sleeve an outer wall of the receiving joint in sequence, and a sealing ring arranged on an inner wall of the receiving joint, a plurality of limiting holes are circumferentially formed in a side wall of the receiving joint, limiting elements are arranged in the plurality of limiting holes, and the plurality of limiting holes are capable of limiting the limiting elements from being inwardly separated from the limiting holes, a first boss is provided on the outer wall of the receiving joint, a second boss is provided on an inner wall of the sliding sleeve, the sliding sleeve sleeves the first boss, the second boss abuts against the outer wall of the receiving joint, such that the first boss, the second boss, the sliding sleeve and the receiving joint form a mounting cavity for receiving an elastic element in a compressed state, a recess and a boss base extending along the inside of the receiving joint are formed in the inner wall of the receiving joint, the sealing ring is arranged on the boss base, extends on the boss base along a radial direction of the receiving joint, and extends into the recess along an axial direction perpendicular to the radial direction of the receiving joint, the male connector comprises a male connector body, a plurality of limiting grooves are circumferentially formed in an outer wall of the male connector body;

when the male connector body is inserted into the receiving joint, the second boss slides to the limiting holes and presses the limiting elements into the limiting grooves; and when the second boss slides away from the limiting holes, the limiting elements are capable of being separated from the limiting grooves; and the male connector body is configured for being inserted into the receiving joint and abutting against a part of the sealing ring located on the boss base and a part of the sealing ring located in the recess, wherein the part of the sealing ring located on the boss base is configured for abutting against and sealing an end surface of the female connector, and the part of the sealing ring located in the recess is configured for abutting against and sealing a side surface of the male connector.

2. The quick insertion locking connector according to claim 1, wherein the sealing ring extends along an inner wall of the recess and is bent towards an interior of the receiving joint to form a bending part, and the bending part is attached to the outer wall of the male connector body.

3. The quick insertion locking connector according to claim 2, wherein the limiting elements are limiting balls or limiting blocks.

4. The quick insertion locking connector according to claim 1, wherein the limiting grooves each have an arc surface.

5. The quick insertion locking connector according to claim 1, wherein the elastic element is a spring.

6. The quick insertion locking connector according to claim 1, wherein the limiting holes are stepped holes, so that the limiting elements are capable of entering into the limiting grooves through the stepped holes and being clamped in the limiting grooves.

7. The quick insertion locking connector according to claim 6, wherein the stepped holes are circumferentially and uniformly formed in the side wall of the receiving joint.

8. The quick insertion locking connector according to claim 1, wherein the receiving joint and the male connector body are made of carbon steel, aluminum alloy, copper alloy or stainless steel.

9. The quick insertion locking connector according to claim 1, wherein a side, away from the sealing ring, of the second boss is an inclined surface.

* * * * *